Dec. 27, 1955 T. M. GLUYAS, JR 2,728,892

MODULATOR CIRCUIT

Filed June 18, 1952 3 Sheets-Sheet 1

INVENTOR.

Thomas M.Gluyas, Jr.

BY Charles H. Brown

ATTORNEY

INVENTOR.
Thomas M. Gluyas, Jr.
BY Charles H. Brown
ATTORNEY

Dec. 27, 1955 T. M. GLUYAS, JR 2,728,892

MODULATOR CIRCUIT

Filed June 18, 1952 3 Sheets-Sheet 3

INVENTOR.
Thomas M. Gluyas, Jr.

BY Charles H. Brown
ATTORNEY

United States Patent Office 2,728,892

Patented Dec. 27, 1955

2,728,892

MODULATOR CIRCUIT

Thomas M. Gluyas, Jr., Haddon Township, Camden County, N. J., assignor to Radio Corporation of America, a corporation of Delaware Application June 18, 1952, Serial No. 294,215

The terminal 15 years of the term of the patent to be granted has been disclaimed 17 Claims. (Cl. 332—63)

This invention relates to a modulator circuit, and more particularly to a circuit useful for modulating the video carrier of a television transmitter in accordance with composite video signals.

An object of this invention is to provide a modulator circuit by the use of which the linearity of the modulation characteristic of a transmitter may be greatly improved, as compared with those of prior transmitters.

Another object is to devise a novel type of cathode modulation circuit which has desirable advantages.

A further object is to provide a novel type of grid bias modulation circuit which gives improved linearity of the transmitter modulation characteristic.

The foregoing and other objects of the invention will be best understood from the following description of some exemplifications thereof, reference being had to the accompanying drawings, wherein.

The objects of this invention are accomplished, briefly, in the following manner:

The anodes of the modulator tube or tubes (which tube or tubes may be thought of in some cases as constituting the final video amplifier) are connected directly to the cathode of the radio frequency (R. F.) power amplifier tube or modulated stage, so that the modulator tube or tubes may be considered to be connected in series with the cathode of the power amplifier to be modulated. The modulator tube or tubes are preferably but not necessarily tetrodes, or other tubes of high plate resistance. The R. F. carrier is applied to the grid of the power amplifier and the video signal is applied to the grid of the modulator tube or tubes from preceding video amplifier stages. Video currents are fed back in negative sense from the modulator to the video amplifier for the purpose of improving the linearity of the modulation characteristic. In a modification, the anode of the modulator tube or tubes is coupled to the grid of the R. F. power amplifier or modulated stage, rather than to its cathode, in order to provide grid bias modulation rather than cathode modulation of this stage. In this case, degenerative or negative feedback from the modulated stage to the video amplifier is used, for the purpose of improving the linearity of the modulation characteristic.

In the past, television transmitters have ordinarily been plate modulated or grid bias modulated. Plate modulation is uneconomical when wideband video modulation is employed, because of the difficulty of developing the large video voltage required across the capacitance that is inherent in the modulated R. F. stage. Plate modulation also is deficient in more subtle ways, for example, an undesired variation in input impedance over the modulation cycle. Grid bias modulation overcomes these deficiencies, but as conventionally employed has the disadvantage that the process is inherently non-linear, and would be so even if ideal tubes could be obtained.

Figure 1:
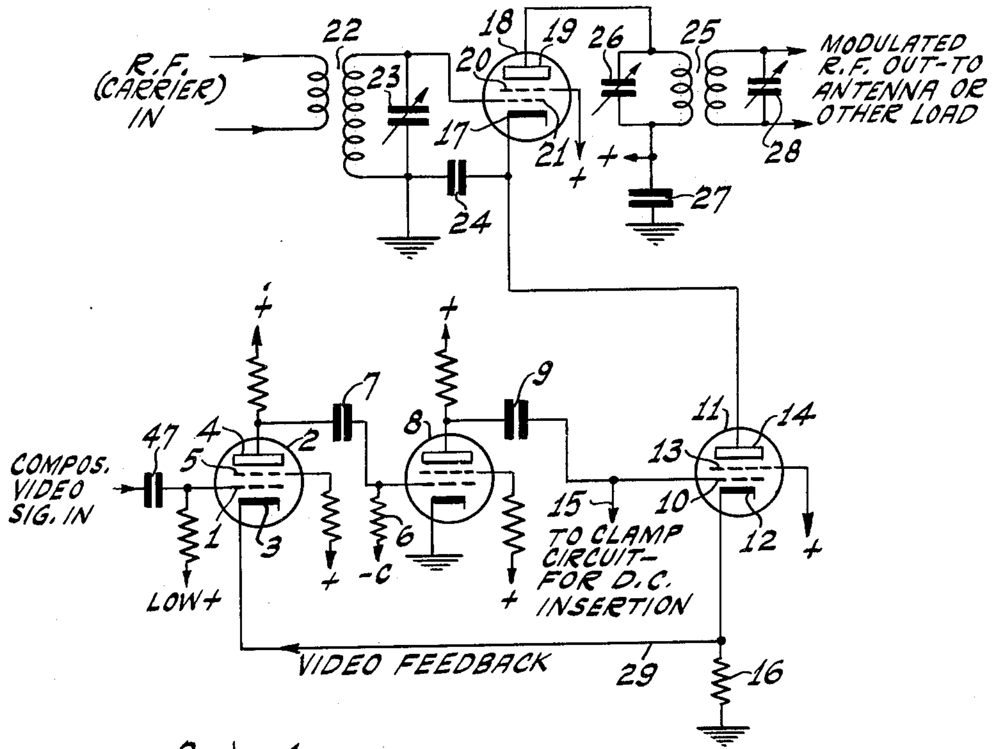
Fig. 1 is a simplified schematic diagram of a circuit arrangement according to this invention.

According to one embodiment of this invention as disclosed in Fig. 1, a type of modulation different from either of the two types previously mentioned is utilized. Referring now to this figure, a composite video signal is applied through a capacitor 47 to the control grid 1 of a first amplifier stage utilizing an evacuated tetrode electron discharge device 2 including a cathode 3, an anode 4 and a screen grid 5, in addition to the control grid 1. Polarizing potentials are supplied to the anode 4, screen 5 and control grid 1 through resistors, in the manner illustrated. The amplified video signal at anode 4 is coupled through an RC coupling including a resistor 6 and a capacitor 7 to the control grid of a following amplifier stage constituted by an evacuated tetrode electron discharge device 8, the cathode of which is grounded and the remaining electrodes of which are supplied with appropriate polarizing potentials through resistors in the manner illustrated.

The amplified video signal at the anode of tube 8 is applied through a coupling capacitor 9 to the control grid 10 of a video modulator tube comprising an evacuated tetrode electron discharge device 11 having a cathode 12, a screen grid 13 and an anode 14. A connection 15 extends from control grid 10 to a clamp circuit which can be of more or less conventional type, to reinsert the television D.-C. component (lost because of A. C. or capacitive coupling between the prior amplifier stages) into the modulation signal. The cathode 12 of tube 11 is connected through a resistor 16 of small value (on the order of 6 ohms, for example) to ground. Potential of positive polarity is applied to screen 13, as illustrated.

The modulator 11 is connected in series with the cathode of the power amplifier to be modulated. To effect this, anode 14 is connected to the cathode 17 of the R. F. power amplifier tube 18 which may be an evacuated tetrode electron discharge device including cathode 17, an anode 19, a screen grid 20 and a control grid 21. The R. F. carrier, which is to be amplitude modulated in the modulated stage 18, is applied to control grid 21 by means of a transformer 22 the primary of which is coupled to a suitable source of R. F. energy and the secondary of which has one of its two ends connected to grid 21 and its opposite end connected to ground and to cathode 17 through a bypass capacitor 24. Usually, the R. F. carrier is much higher in frequency than the maximum video frequency so that capacitor 24 may be selected to have a relatively low impedance at carrier frequency and a relatively high impedance at video frequencies. The secondary of transformer 22 may be tuned by a variable capacitor 23. The amplitude modulated R. F. output of the circuit described is derived through an output transformer 25 the primary winding of which is connected to anode 19. This primary winding is tuned by a variable capacitor 26 and is bypassed to ground by a bypass capacitor 27. The secondary winding of transformer 25 may be tuned by a variable capacitor 28 and from opposite ends of this secondary, connections extend to an antenna or other load.

Polarizing potentials are applied to screen grid 20 and anode 19 in the manner illustrated. Since anode 19 of tube 18 is connected to the positive terminal of a unidirectional potential source the negative terminal of which is grounded, since cathode 17 is connected to anode 14 of tube 11 and since cathode 12 is grounded through resistor 16, the anode-cathode paths of tubes 18 and 11 may be considered to be essentially in series (for current flow) across the unidirectional potential source. Thus, amplitude modulation of the R. F. carrier is effected by variation of the anode-cathode current flowing in tube 18 in response to the modulating signal applied to grid 10 of tube 11.

The load impedance $R_L$ on the modulator 11 is equal to the variation in cathode voltage required to modulate the power amplifier divided by the variation in power amplifier anode current. Expressed in mathematical form, $$R_L = \frac{\Delta E_K}{\Delta I_K}$$

where $E_K$ is the video voltage required to modulate the power amplifier and $I_K$ is the cathode current of the power amplifier.

It will be noted in Fig. 1 that a tetrode is employed as the video modulator 11. As will be noted hereinafter in connection with Fig. 2, pentodes may alternatively be employed as the video modulator tubes. Both tetrodes and pentodes characteristically have very high plate resistances, as is well-known to those skilled in the art. The variable load impedance $R_L$ (impedance of the modulated stage cathode circuit) on the modulator will normally be much lower than the plate resistance of the modulator, particularly if tetrodes or pentodes of the high plate resistance referred to, are used. For this reason, the anode current which flows in the power amplifier 18 is determined substantially entirely by the transfer characteristics of the modulator 11 and is independent of the characteristics of the power amplifier 18.

The modulation characteristic of a transmitter is generally understood to be the relation of the R. F. output voltage of the transmitter to the instantaneous video or modulating potential. It is highly desirable that this relation be linear. It has been observed, and also determined by calculations, that the R. F. output voltage of a cathode modulated (amplifier 18, Fig. 1) power amplifier or a grid bias modulated (Fig. 5, to be later described in detail) power amplifier is substantially directly proportional to the power amplifier anode current. Consequently, if the anode current of the modulated stage can be made to be a linear function of the instantaneous video modulating potential, then the transmitter modulation characteristic will be linear. The basic idea of this invention is to obtain improved transmitter linearity by making the anode current of the modulated stage, and consequently the R. F. output voltage of the modulated stage, a linear function of the instantaneous video signal.

Since the two tubes 18 and 11 are in series across the power source, the total current drawn by power amplifier tube 18 will also flow through modulator tube 11. The grid and screen currents drawn by the power amplifier tube 18 are generally small in the white-to-black (of the television picture) region of operation, so that the modulator anode current is substantially equal to the power amplifier anode current. Therefore, it follows that the R. F. output voltage of the transmitter will be substantially directly proportional to the modulator anode current when the circuit of Fig. 1 is utilized.

A preferred way of obtaining a linear relationship between the instantaneous video modulating signal and the modulated stage anode current (thus making the transmitter modulation characteristic linear) is to employ cathode modulation (as in Fig. 1) and also negative feedback of the video signal from the modulator 11 to the video amplifier ahead of it (as also illustrated in Fig. 1). Negative feedback varies the resultant transfer characteristic of the amplifier stage or stages to which it is applied, reduces amplitude distortion, reduces frequency and phase distortion, reduces the variation of amplification with input voltage, etc. In this case, the modulator tube 11 does not necessarily have to have extremely high plate resistance because the negative or degenerative current feedback will cause the modulator to behave as if it had very high plate resistance compared to the low but variable impedance of the modulated stage 18 cathode circuit. Thus, the modulator 11 behaves as a constant current video generator. However, if desired the modulator tube 11 can be of the type having very high plate resistance. This arrangement (cathode modulation and the use of negative feedback of video current from the modulator to the video amplifier) is preferred to an arrangement using cathode modulation without feedback but with a modulator tube of very high plate resistance because modulator tubes are generally non-linear; although in principle the arrangement without feedback may overcome the difficulty of non-linearity in the modulated stage, such an overall system will still be non-linear due to the characteristics of the usual type of tetrodes or pentodes that would be used for the modulator 11. The feedback system now to be described in greater detail, overcomes the non-linearity of both the modulator and the modulated stage, resulting in a marked improvement in overall transmitter linearity.

In the circuit of Fig. 1, negative, inverse or degenerative feedback of the video signal is effected by means of a lead 29 connected from the small resistor 16 (which is in series with the modulator cathode 12 and across which there is developed a signal proportional to the modulation frequency circuit in the modulator) to the cathode 3 of the preceding video amplifier 2. If feedback is effected in this way, it should be applied to the cathode of the second preceding stage 2 (rather than to the cathode of the immediately preceding stage 8), in order that the proper phase relation for negative feedback can be achieved.

Figure 2:
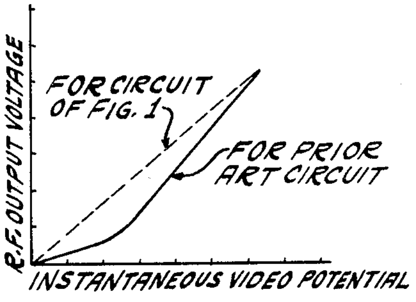
Fig. 2 is a set of transmitter characteristics, illustrating the improvement in linearity obtainable with the circuit of Fig. 1.

The negative video feedback from the resistor 16 to stage 2 improves the linearity of the overall transmitter characteristic, due to its effect on the transfer characteristic of stage 11 and on the modulator anode current, and to its resultant effect on the R. F. output voltage of the transmitter, in the manner described. Fig. 2 illustrates the approximate improvement in linearity of the overall transmitter characteristic obtained with the circuit of Fig. 1, over prior art circuits such as those utilizing the ordinary grid bias modulation, without any feedback. In this figure, rectified R. F. output voltage is plotted against instantaneous video potential, to give the overall transmitter characteristic for the two compared circuits. In an experimental comparison made for the circuit of Fig. 1, the solid line curve in Fig. 2 represents the modulation characteristic obtained when using a conventional grid bias modulation circuit, with no negative feedback. The total harmonic distortion for this case was found to be 24%. The dotted-line curve in Fig. 2 represents the characteristic for the Fig. 1 circuit, with cathode modulation and negative feedback from the modulator back to the video amplifier. The enormous improvement in transmitter linearity can be noted. The total harmonic distortion for this case was found to be only 3.9%. This is a large improvement, percentagewise. For this latter case, the amount of feedback employed in the experimental setup was not as great as would actually be employed in a television transmitter, so that in an actual transmitter the improvement in linearity obtained by use of this invention would be even greater.

Alternatively, the negative feedback can be effected by using an unbypassed cathode resistor in the cathode 12 circuit of modulator 11 and eliminating lead 29. Such a resistor, as is well-known to those skilled in the art, produces degeneration (which is equivalent to negative feedback) in tube 11.

Figure 3:
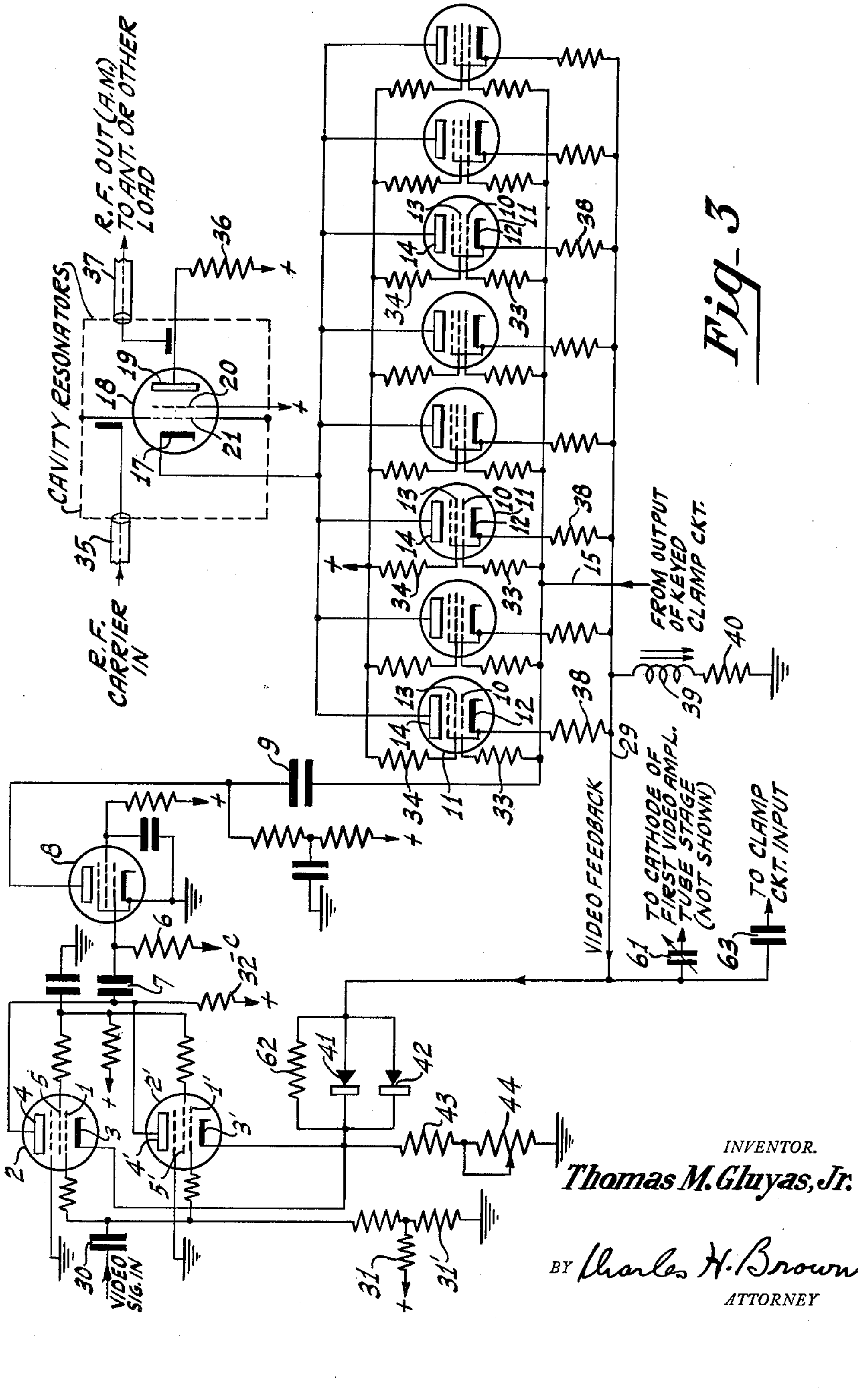
Fig. 3 is a schematic diagram of a practical embodiment of Fig. 1, such as might be used in a television transmitter.

Fig. 3 is a schematic circuit diagram of a practical embodiment of Fig. 1, such as might be used in a commercial television transmitter. In this figure, parts the same as those of Fig. 1 are denoted by the same reference numerals, in so far as possible. In Fig. 3, the composite video signal is fed from the output of the first video amplifier tube stage (not shown) through a coupling capacitor 30 to the control grids 1 and 1', respectively, of two parallel-connected pentodes 2 and 2', which together constitute an amplifying stage similar to tube 2 in Fig. 1. A bias which is negative with respect to the potential of cathodes 3 and 3' (which are connected to the modulator cathodes 12) but which is about 4 volts positive with respect to ground, is applied to grids 1 and 1'. This bias is obtained from a voltage divider including two series resistors 31 and 31' connected from the positive potential source to ground. The cathodes 3 and 3' of tubes 2 and 2' are connected together, while the suppressor grids of both these tubes are grounded. Screen grid potentials are applied to both screens 5 and 5' of tubes 2 and 2' from the positive terminal of a unidirectional potential source, through separate resistors. The anodes 4 and 4' of tubes 2 and 2' are connected together and to the positive terminal of a unidirectional potential source through a resistor 32.

The amplified output of tubes 2 and 2' is coupled through a capacitor 7 to the next succeeding amplifier stage tube 8. Tube 8 may be a pentode, as illustrated, connected quite similarly to tube 8 in Fig. 1.

The amplified video signal output of tube 8 is coupled through capacitor 9 to the respective control grids 10 of each of a plurality (here shown as eight in number) of parallel-connected similar pentodes 11, for example of the 6146 type. The coupling or feed to each control grid is through a separate respective resistor 33. Each suppressor grid is connected internally to its respective cathode, while the respective screen grids 13 are supplied with positive potential from a suitable source through separate respective resistors 34. For clamping the control grids to a certain fixed potential, thereby reinserting the lost D. C. component, the output lead 15 of a keyed clamp circuit (not shown) is connected to the grid side of capacitor 9.

The anodes 14 of all the tubes 11 in Fig. 3 are connected together and to the cathode 17 of the R. F. power amplifier tube 18, which may be a power tetrode of the RCA-6181 type, for example. In this practical embodiment, the respective input and output circuits and transformers 22 and 25 of Fig. 1 are replaced by respective cavity resonators, indicated in Fig. 3 by the dotted-line enclosures around certain of the electrodes of tube 18. The R. F. carrier is fed into the cavity by means of a coaxial line 35 and applied to control grid 21 of tube 18 through a capacitive coupling. Grid 21 is at zero D. C. potential or ground. Positive potential is applied to anode 19 of tube 18 through a resistor 36. Amplitude modulated R. F. output is taken from tube 18 by means of a coaxial line 37 one end of which is capacitively coupled to the anode 19. This coaxial line feeds R. F. energy to an antenna or other suitable load device.

In order to provide negative video feedback from the modulator stage 11 to a preceding video amplifier stage 2, 2', the cathode 12 of each of tubes 14 is connected through a respective resistor 38 to the video feedback lead 29. A choke 39 and resistor 40 are connected from lead 29 to ground. Cathodes 3 and 3' of tubes 2 and 2' are coupled to feedback lead 29 through a pair of parallel-connected rectifiers 41 and 42, which may for example be crystal rectifiers. A resistor 62 shunts the diode rectifiers 41 and 42. The cathodes 3 and 3' are connected to ground through a potentiometric resistance network including a fixed resistor 43 and a potentiometric resistor 44. One terminal of each of rectifiers 41 and 42 is connected to cathodes 3 and 3'.

Choke 39 in the feedback circuit adjusts the phase of the feedback voltage at higher frequencies, in order to maintain a flat frequency response. Controlling the phase in the feedback loop to prevent "singing" is a classical problem, and adjusting the phase in the feedback loop (for example, by means of choke 39) to obtain a flat frequency response is a variation of this well-known technique.

Rectifiers 41 and 42 are biased rectifiers in the feedback circuit which are conducting during the picture interval and non-conducting during part of the synchronizing interval. This arrangement reduces the amount of negative feedback (thus effectively changing the video amplifier gain) during the synchronizing interval for the purpose of increasing the synchronizing amplitude, accomplishing what is known as "sync stretching." The bias for these rectifiers is obtained from the heavy current drawn through resistor 40 by the eight tubes numbered 11 in the modulator. If this bias exceeds the voltage drop in resistors 43 and 44 due to the anode current of tubes 2 and 2', the rectifiers become non-conducting. Diodes 41 and 42 are shunted by resistor 62 for the purpose of controlling the magnitude of the feedback when the diodes are non-conducting.

A capacitive coupling extends from feedback lead 29 through a variable capacitor 61 to the cathode of the first video amplifier tube stage (not shown). This capacitor provides frequency selective positive feedback to the first video amplifier. This provides increased gain at high frequencies to offset the loss of high frequency response due to the amplifier interelectrode capacities and coupling network capacity to ground between the first and second video amplifier stages. Capacitor 61 can be used as an adjustment of the overall frequency response of the transmitter.

A capacitor 63 is used to couple the modulator to the input of a clamping circuit or D.-C. restoration circuit (not shown) the output of which clamps the grids 10 of modulator tubes 11 by means of lead 15.

In Fig. 3, modulation takes place in essentially the same manner as in Fig. 1, previously described. Again in Fig. 3 as in Fig. 1, pentodes 11 having high plate resistances may be employed in combination as the video modulator. Again, the R. F. voltage output of the transmitter (voltage output of tube 18) is essentially directly proportional to the modulator anode current, as in the Fig. 1 circuit, and by employing negative video current feedback from the cathodes 12 of the modulator tubes 11 to the cathodes 3 and 3' of a preceding video amplifier stage including tubes 2 and 2', the overall transmitter characteristic (R. F. output voltage vs. instantaneous video potential) can be made as linear as desired. In these respects, the operation of the Fig. 3 circuit is exactly similar to that of the Fig. 1 circuit, previously described.

Figure 4:
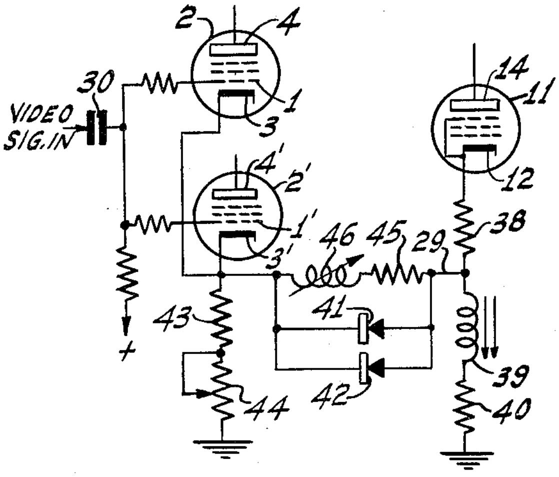
Fig. 4 is a schematic diagram of a modification of a portion of Fig. 2.

Fig. 4 is a partial schematic of a circuit arrangement substantially like that of Fig. 3, but having (instead of the resistor 62 of Fig. 3) a variable inductor 46 and a resistor 45 connected across the diodes 41 and 42. Elements 45 and 46 enable adjustment of the feedback of high frequency components, during the interval in which diodes 41 and 42 are non-conducting. Ordinarily (without elements such as these) changing the amount of feedback during the synchronizing interval (due to the action in Fig. 3, previously described, of diodes 41 and 42) would affect the frequency response during this time, producing an adverse effect upon the shape of the synchronizing signal and also possibly introducing a serious problem in the transmission of color television signals.

Figure 5:
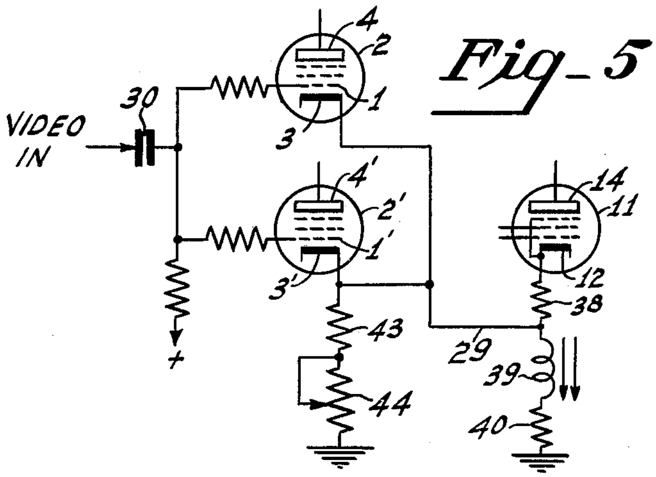
Fig. 5 is a partial schematic of a further modification.

Fig. 5 is a further modification in which the biased rectifiers are omitted from the feedback circuit, in order to obtain a constant-frequency-response characteristic for the video amplifier at all amplitude levels, including the synchronizing level. In this modification, there is thus no provision for automatically changing the gain (as a result of changing the feedback) of the video amplifier as a function of signal amplitude; this means there is no "sync stretch" feature. In Fig. 5, one end of feedback lead 29 is connected to the junction between resistor 38 and choke 39, as before, but the other end of this lead is connected directly to cathodes 3 and 3'. In Fig. 5, the amount of feedback is not changed, throughout the entire range of video signal amplitude.

Figure 6:
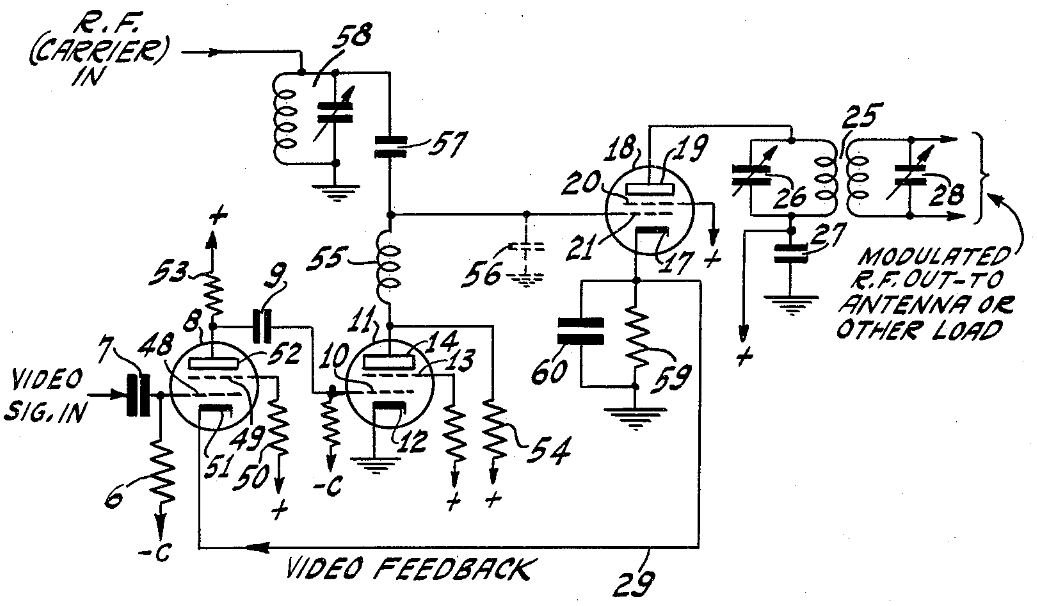
Fig. 6 is a simplified schematic diagram of another type of modulator circuit utilizing the invention.

Fig. 6 is a schematic of a portion of a modified television transmitter according to this invention. This circuit discloses another way for obtaining a linear relationship between the video signal and the modulated stage anode current. The circuit illustrated in Fig. 6 employs grid bias modulation of the power amplifier and negative or degenerative video current feedback from the modulated stage to a video amplifier stage. This circuit achieves all of the advantages of maintaining a linear relationship between the video signal and the modulated stage anode current (consequently, overall transmitter linearity), but requires a smaller modulator than the Fig. 1 circuit. In certain respects, the Fig. 6 arrangement is similar to that of Fig. 1 and similar parts will be denoted by the same reference numerals, in so far as possible.

In Fig. 6, the video signal input is fed from a preceding video amplifier stage through capacitor 7 to the control grid 48 of a video amplifier stage tube 8, which may be an evacuated tetrode. The screen grid 49 of tube 8 is supplied with positive potential from the positive terminal of a unidirectional potential source, through a resistor 50. The electrode structure of tube 8 also includes a cathode 51 and an anode 52. Anode 52 is supplied with positive potential from the positive terminal of the unidirectional source, through a resistor 53.

The amplified video output signal appearing at the anode 52 is coupled through a capacitor 9 to the control grid 10 of modulator tube 11 which includes also cathode 12, screen grid 13 and anode 14. If desired, a connection (not shown) may be made from a suitable clamp circuit to grid 10, to clamp such grid and reinsert the D.-C. video component. In this case, cathode 12 is connected directly to ground, while anode 14 is supplied with positive potential from a suitable point on the power supply, through video modulator load resistor 54. Screen grid 13 is supplied with positive potential through a resistor.

To effect grid bias modulation of the R. F. carrier, the modulating signal appearing at anode 14 is coupled through an R. F. choke 55 to the control grid 21 of the R. F. power amplifier tube (modulated stage) 18. The inherent capacitance between grid 21 and ground is denoted by capacitor 56. R. F. carrier energy is applied to control grid 21 through a capacitor 57 from the high R. F. potential end of a tuned circuit 58 the other end of which is grounded. R. F. energy is supplied from a suitable source to the high R. F. potential end of circuit 58. The cathode 17 of tube 18 is connected to ground through a resistor 59 of low ohmic value bypassed by an R. F. bypass capacitor 60.

In Fig. 6, a grid bias modulation of the R. F. carrier applied to grid 21 is effected by variation of the voltage on such grid in response to the modulating signal appearing at anode 14 of tube 11. Amplitude modulation of such carrier is thus accomplished. The amplitude modulated R. F. output appearing at anode 19 is abstracted and utilized by means of circuitry which is the same as that of Fig. 1.

In the Fig. 6 embodiment, negative feedback of the video signal is effected from the small resistor 59 in the power amplifier cathode circuit (by connecting one end of the feedback lead 29 to cathode 17) to the cathode 51 of the video amplifier tube 8 which immediately precedes the modulator 11. Thus, there is video current feedback from the modulated stage to the video amplifier. Negative feedback (that is, negative or degenerative feedback of the video signal) applied in this manner will make the anode current in power amplifier tube 18 directly proportional to the instantaneous video potential. As previously stated, it has been found that the R. F. output voltage of a grid bias modulated power amplifier is substantially directly proportional to the power amplifier (modulated stage) plate or anode current. Therefore, the linearity of the overall transmitter characteristic (R. F. output voltage vs. instantaneous video potential) will be greatly improved by the circuit of Fig. 6 as compared to similar characteristics of prior art arrangements.

Alternatively, instead of the feedback connection shown in Fig. 6, feedback could be applied from the power amplifier cathode circuit small resistor 59 to the modulator input 10. For this connection, feedback lead 29 would be disconnected from cathode 51 (which would then be grounded) and connected instead to control grid 10 of modulator tube 11.

In Fig. 6, there is negative or degenerative video current feedback from the modulated stage 18 to the video amplifier stage 8. This gives a substantially linear relationship between the video modulating signal and the modulated stage plate current, and consequently overall transmitter linearity. Transmitter modulation characteristics were taken with an experimental setup for comparison purposes, using on the one hand more or less conventional grid bias modulation (without negative feedback), and on the other hand grid bias modulation with feedback as in the modification of Fig. 6 suggested in the preceding paragraph (that is, from the cathode 17 of the modulated stage 18 to the input or control grid 10 of the modulator 11). For each of the two setups just referred to, the modulation characteristics were obtained (that is, the relations between rectified R. F. output voltage and instantaneous video input or modulating potential). In the case of conventional grid bias modulation with no negative feedback, the total harmonic distortion was found to be 24%. On the other hand, using grid bias modulation with negative feedback according to this invention, the total harmonic distortion was found to be only 2.8%. This is a large improvement, percentage-wise. For this latter case, again the amount of feedback employed in the experimental setup was not as great as would actually be employed in a television transmitter, so that in an actual transmitter the improvement in linearity obtained by the use of this invention would be even greater.

The circuit of Fig. 3 has been successfully applied to a television transmitter operating in the U. H. F. television band (470–890 megacycles). A television transmitter utilizing the principles of Fig. 3 has been built and successfully tested. In this transmitter, each of tubes 11 was an RCA type 6146 tube, tube 18 was an RCA–6181 tube, tube 8 was an RCA–6146 tube, while tubes 2 and 2' were each RCA–5763 tubes. The transmitter referred to was designed to have an output (from tube 18) of one kilowatt of power, in the U. H. F. band.

What is claimed is:

1. In a transmitter, a modulator electron discharge device stage, the device of which has a cathode electrode, a modulated electron discharge device stage the device of which has a cathode electrode, said last-named stage being coupled to said first-named stage, means including at least one electron discharge device modulation amplifier for amplifying a modulating signal and applying it to said modulator stage, said last-named device having a cathode electrode, means for applying carrier energy to be modulated to said modulated stage, and connections between the cathode of one of said stages and the cathode of the modulation amplifier for degeneratively feeding back modulating signal energy from said one stage to said amplifier.

2. In a transmitter, a modulator electron discharge device having at least anode and cathode electrodes, a modulated electron discharge device having at least anode and cathode electrodes, means coupling the anode-cathode paths of said devices in series across a potential source, means for applying carrier energy to be modulated to said modulated device, means including at least one modulation amplifier for amplifying a modulating signal and applying it to said modulator device, and means for degeneratively feeding back modulating signal energy from said modulator device to said amplifier.

3. In a transmitter, a modulator electron discharge device having at least anode and cathode electrodes, a modulated electron discharge device having at least anode and cathode electrodes, means coupling the anode-cathode paths of said devices in series across a potential source, means for applying carrier energy to be modulated to said modulated device, a modulation amplifier electron discharge device having a cathode electrode, means for applying a modulating signal to said last-named device for amplification thereby, means for applying the output of said last-named device to said modulator device, and a connection between the cathodes of said modulator device and of said modulation amplifier device for degeneratively feeding back modulating signal energy from the modulator device to the modulation amplifier device.

4. In a transmitter, a modulator electron discharge device having an anode electrode, a modulated electron discharge device having at least anode and control electrodes, means coupling the anode of said modulator device to the control electrode of said modulated device to provide a variable modulation-signal-responsive bias thereon, means for applying carrier energy to be modulated to said modulated device, a modulation amplifier electron discharge device for amplifying a modulating signal and applying it to said modulator device, and means for degeneratively feeding back modulating signal energy from said modulated device to another of said devices.

5. In a transmitter, a modulator electron discharge device having an anode electrode, a modulated electron discharge device having at least anode, cathode and control electrodes, means coupling the anode of said modulator device to the control electrode of said modulated device to provide a variable modulation-signal-responsive bias thereon, means for applying carrier energy to be modulated to said modulated device, a modulation amplifier electron discharge device for amplifying a modulating signal and applying it to said modulator device, and means for degeneratively feeding back modulating signal energy from the cathode of said modulated device to another of said devices.

6. In a transmitter, a multigrid modulator electron discharge device having high plate resistance and having an anode electrode, a modulated electron discharge device having at least anode, cathode and control electrodes, means coupling the anode of said modulator device to the control electrode of said modulated device to provide a variable modulation-signal-responsive bias thereon, means for applying carrier energy to be modulated to said modulated device, a modulation amplifier electron discharge device having a cathode electrode, means for applying a modulating signal to said last-named device for amplification thereby, means for applying the output of said last-named device to said modulator device, and a connection between the cathodes of said modulated device and of said modulation amplifier device for degeneratively feeding back modulating signal energy from the modulated device to the modulation amplifier device.

7. In a transmitter, a plurality of electron discharge devices constituting a modulator stage, each device having at least anode and cathode electrodes, means connecting the anodes of all said devices in parallel, means connecting the cathodes of all said devices in parallel, a modulated electron discharge device having at least anode and cathode electrodes, means coupling the anode-cathode path of said last-named device in series with the paralleled anode-cathode paths of said plurality of devices across a potential source, means for applying carrier energy to be modulated to the said modulated device, means including at least one modulation amplifier for amplifying a modulating signal and applying it in parallel to all said plurality of devices, and means for degeneratively feeding back modulating signal energy from said plurality of modulator devices to said modulation amplifier.

8. In a transmitter, a plurality of electron discharge devices constituting a modulator stage, each device having at least anode and cathode electrodes, means connecting the anodes of all said devices in parallel, means connecting the cathodes of all said devices in parallel, a modulated electron discharge device having at least anode and cathode electrodes, means coupling the anode-cathode path of said last named device in series with the paralleled anode-cathode paths of said plurality of devices across a potential source, means for applying carrier energy to be modulated to the said modulated device, a plurality of electron discharge devices constituting a modulation amplifier stage, each of said last-named plurality of devices having a cathode electrode, means for applying a modulating signal in parallel to all said last-named plurality of devices, means for coupling the output signal from said last-named plurality of devices to another amplifier stage, means for applying the output of the last-named amplifier stage in parallel to all the first-named plurality of devices, and a connection between the cathodes of the first-named plurality of devices and the cathodes of the last-named plurality of devices for degeneratively feeding back modulating signal energy from the plurality of modulator devices to the plurality of modulation amplifier devices.

9. In a transmitter, a modulator electron discharge device stage, the device of which has a cathode electrode, a modulated electron discharge device stage the device of which has a cathode electrode, said last-named stage being coupled to said first-named stage, means including at least one electron discharge device modulation amplifier for amplifying a modulating signal and applying it to said modulator stage, said last-named device having a cathode electrode, means for applying carrier energy to be modulated to said modulated stage, and connections between the cathode of said modulator stage and the cathode of the modulation amplifier for degeneratively feeding back modulating signal energy from said modulator stage to said amplifier.

10. In a transmitter, a modulator electron discharge device stage, the device of which has a cathode electrode, a modulated electron discharge device stage the device of which has a cathode electrode, said last-named stage being coupled to said first-named stage, means including at least one electron discharge device modulation amplifier for amplifying a modulating signal and applying it to said modulator stage, said last-named device having a cathode electrode, means for applying carrier energy to be modulated to said modulated stage, and connections between the cathode of said modulated stage and the cathode of the modulation amplifier for degeneratively feeding back modulating signal energy from said modulated stage to said amplifier.

11. In a transmitter, a modulator electron discharge device having anode and cathode electrodes, said device being a multigrid device having high plate resistance, a modulated electron discharge device having at least anode and cathode electrodes, means coupling the anode-cathode paths of said devices in series across a potential source, means for applying carrier energy to be modulated to said modulated device, means including at least one modulation amplifier for amplifying a modulating signal and applying it to said modulator device, and means for degeneratively feeding back modulating signal energy from said modulator device to said amplifier.

12. In a transmitter, a modulator electron discharge device having at least anode and cathode electrodes, a modulated electron discharge device having at least anode and cathode electrodes, means coupling the anode-cathode paths of said devices in series across a potential source, means for applying carrier energy to be modulated to said modulated device, means including at least one modulation amplifier for amplifying a modulating signal and applying it to said modulator device, and means for degeneratively feeding back modulating signal energy from the cathode of said modulator device to said amplifier.

13. In a transmitter, a modulator electron discharge device having anode and cathode electrodes, said device being a multigrid device having high plate resistance, a modulated electron discharge device having at least anode and cathode electrodes, means coupling the anode-cathode paths of said devices in series across a potential source, means for applying carrier energy to be modulated to said modulated device, means including at least one modulation amplifier for amplifying a modulating signal and applying it to said modulator device, and means for degeneratively feeding back modulating signal energy from the cathode of said modulator device to said amplifier.

14. In a transmitter, a modulator electron discharge device having anode and cathode electrodes, said device being a multigrid device having high plate resistance, a modulated electron discharge device having at least anode and cathode electrodes, means coupling the anode-cathode paths of said devices in series across a potential source, means for applying carrier energy to be modulated to said modulated device, a modulation amplifier electron discharge device having a cathode electrode, means for applying a modulating signal to said last-named device for amplification thereby, means for applying the output of said last-named device to said modulator device, and a connection between the cathodes of said modulator device and of said modulation amplifier device for degeneratively feeding back modulating signal energy from the modulator device to the modulation amplifier device.

15. In a transmitter, a plurality of electron discharge devices constituting a modulator stage, each of said devices being a multigrid device having high plate resistance and each device having anode and cathode electrodes, means connecting the anodes of all said devices in parallel, means connecting the cathodes of all said devices in parallel, a modulated electron discharge device having at least anode and cathode electrodes, means coupling the anode-cathode paths of said last-named device in series with the paralleled anode-cathode paths of said plurality of devices across a potential source, means for applying carrier energy to be modulated to said modulated device, means including at least one modulation amplifier for amplifying a modulating signal and applying it in parallel to all said plurality of devices, and means for degeneratively feeding back modulating signal energy from said plurality of modulator devices to said modulation amplifier.

16. In a transmitter, a plurality of electron discharge devices constituting a modulator stage, each of said devices being a multigrid device having high plate resistance and each device having anode and cathode electrodes, means connecting the anodes of all said devices in parallel, means connecting the cathodes of all said devices in parallel, a modulated electron discharge device having at least anode and cathode electrodes, means coupling the anode-cathode path of said last-named device in series with the paralleled anode-cathode paths of said plurality of devices across a potential source, means for applying carrier energy to be modulated to said modulated device, means including at least one modulation amplifier for amplifying a modulating signal and applying it in parallel to all said plurality of devices, and means for degeneratively feeding back modulating signal energy from the cathodes of said plurality of modulator devices to said modulation amplifier.

17. In a transmitter, a plurality of electron discharge devices constituting a modulator stage, each of said devices being a multigrid device having high plate resistance and each device having anode and cathode electrodes, means connecting the anodes of all said devices in parallel, means connecting the cathodes of all said devices in parallel, a modulated electron discharge device having at least anode and cathode electrodes, means coupling the anode-cathode path of said last-named device in series with the paralleled anode-cathode paths of said plurality of devices across a potential source, means for applying carrier energy to be modulated to the said modulated device, a plurality of electron discharge devices constituting a modulation amplifier stage, each of said last-named plurality of devices having a cathode electrode, means for applying a modulating signal in parallel to all said last-named plurality of devices, means for coupling the output signal from said last-named plurality of devices to another amplifier stage, means for applying the output of the last-named amplifier stage in parallel to all the first-named plurality of devices, and a connection between the cathodes of the first-named plurality of devices and the cathodes of the last-named plurality of devices for degeneratively feeding back modulating signal energy from the plurality of modulator devices to the plurality of modulation amplifier devices.

References Cited in the file of this patent

UNITED STATES PATENTS

| | | |
|---|---|---|
| 2,325,366 | Brown | July 27, 1943 |
| 2,469,218 | Thomas | May 3, 1949 |
| 2,534,073 | Sherwood et al. | Dec. 12, 1950 |
| 2,572,016 | Elbourn | Oct. 23, 1951 |